United States Patent
Cholley et al.

(10) Patent No.: US 7,686,947 B2
(45) Date of Patent: Mar. 30, 2010

(54) HYDROTREATING CATALYST, PROCESS FOR ITS PREPARATION AND ITS USE IN A PROCESS FOR THE PURIFICATION OF HYDROCARBONS

(75) Inventors: Thierry Cholley, Brussels (BE); Jean-Pierre Dath, Beloeil Hainaut (BE)

(73) Assignee: Totalfinaelf France, Puteaux (FR)

( * ) Notice: Subject to any disclaimer, the term of this patent is extended or adjusted under 35 U.S.C. 154(b) by 1292 days.

(21) Appl. No.: 10/542,269

(22) PCT Filed: Jan. 15, 2004

(86) PCT No.: PCT/FR2004/000071

§ 371 (c)(1), (2), (4) Date: Jul. 15, 2005

(87) PCT Pub. No.: WO2004/067683

PCT Pub. Date: Aug. 12, 2004

(65) Prior Publication Data

US 2006/0054537 A1 Mar. 16, 2006

(30) Foreign Application Priority Data

Jan. 16, 2003 (FR) .................................. 03 00439

(51) Int. Cl.
  *C10G 45/04* (2006.01)
(52) U.S. Cl. ................... 208/208 R; 208/240; 208/209; 208/211; 208/213; 208/215; 208/216 R; 208/217
(58) Field of Classification Search ............. 208/208 R, 208/240, 209, 211, 213, 215, 216 R, 217
See application file for complete search history.

(56) References Cited

U.S. PATENT DOCUMENTS

| | | | | |
|---|---|---|---|---|
| 3,719,589 A | * | 3/1973 | Herbstman et al. | 208/208 R |
| 3,816,301 A | * | 6/1974 | Sorgenti | 208/208 R |
| 3,945,914 A | | 3/1976 | Yoo et al. | |
| 5,454,933 A | | 10/1995 | Savage et al. | |
| 5,958,224 A | | 9/1999 | Dupre et al. | |
| 6,368,495 B1 | * | 4/2002 | Kocal et al. | 208/240 |
| 2006/0226049 A1 | * | 10/2006 | Nemeth et al. | 208/208 R |

FOREIGN PATENT DOCUMENTS

FR  2 818 990 A  7/2002

OTHER PUBLICATIONS

International Search Report dated Jun. 9, 2004.

* cited by examiner

*Primary Examiner*—Tam M Nguyen
(74) *Attorney, Agent, or Firm*—Sughrue Mion, PLLC

(57) ABSTRACT

The invention relates to a process for hydrotreatment of a hydrocarbon feedstock, comprising the step of carrying out in situ or ex situ sulfurization of a catalyst and hydrotreating the hydrocarbon feedstock in the presence of the catalyst wherein at least one sulfur compound may be present in the feedstock; and a process for the purification of a hydrocarbon feedstock, comprising hydrotreating the hydrocarbon feedstock in the presence of a catalyst after sulfurization of the catalyst and oxidizing desulfurization of the hydrotreated feedstock; wherein the catalyst comprises a refractory oxide support, at least one metal of the Group VIII and at least one metal of the Group VI, both in an oxidized form, and at least one sulphone or sulphoxide compound derived from a benzothiophene compound.

13 Claims, No Drawings

HYDROTREATING CATALYST, PROCESS FOR ITS PREPARATION AND ITS USE IN A PROCESS FOR THE PURIFICATION OF HYDROCARBONS

The present invention relates to a hydrotreating catalyst, to its method of preparation and to the use of this catalyst in a process for the purification of hydrocarbons, in particular those resulting from petroleum fractions with a boiling point preferably of between 40 and 560° C.

Currently, the demand for desulfurized, denitrogenated and dearomatized hydrocarbon compounds is increasing and numerous studies are being carried out for the purpose of developing catalysts which are increasingly effective with regard to the purification of hydrocarbons. However, these novel catalysts, which are targeted at obtaining sulfur contents of less than 10 ppm, are much more expensive and are accessible only from a limited number of producers. In addition, from their first regeneration, these catalysts exhibit a much lower activity than their initial activity in the fresh state under the same operating conditions. Only an additional specific rejuvenation treatment sometimes makes it possible to recover this initial activity, making it possible to achieve sulfur contents of less than 10 ppm.

Numerous "conventional" catalysts, based on supports formed of refractive oxides and comprising oxidized Co/Mo or Ni/Mo metal pairs, are still widely used today in refineries, in the fresh or regenerated state, either in hydrotreating or in hydrocracking. If it proves to be impossible to significantly increase their activity in desulfurization and/or denitrogenation treatments, these catalysts will eventually have to be recovered, stored or destroyed when the specifications with regard to the contents of sulfur in fuels become so restrictive that it will no longer be possible to use them. In addition, there is a risk that this storage or this removal of the solids will be subject to environmental and safety restrictions and will then generate significant additional costs for refiners.

The Applicant Company has thus envisaged rendering "conventional" catalysts based on refractive oxides and on metals from Groups VI and VIII more effective by modifying them by novel means in order to confer theiron desulfurization and denitrogenation activities at least equivalent to those of the best catalysts on the market and in particular greater than those of these regenerated catalysts.

All hydrotreating or hydrocracking catalysts are necessarily sulfurized before being used. This sulfurization can be carried out either in situ, in the hydrotreating reactor, or ex situ, using hydrogen sulfide, mercaptans, sulfides, polysulfides and/or native sulfur, these compounds being introduced alone, as a mixture with a solvent or at the same time as the feedstock. Some of these catalysts are modified before sulfurization, this modification consisting in treating these catalysts with chelating or sulfurizing compounds. It is thus known to modify these catalysts using acids of thioglycolic type or else thioalcohols, thioacetone compounds and thiodiazoles or thiocyanates, such as provided in particular by Sumitomo patents (EP 289 211, EP 300 629, EP 338 788, EP 357 295, EP 456 592, EP 478 365 and EP 506 206). Other catalysts have been modified by treatment using alcohol-acid organic compounds (EP 482 817), optionally etherified mono-, di- or polyalcohols (EP 601 722, U.S. Pat. Nos. 3,954, 673, 4,012,340 and WO 01/76741) or compounds of the following types: urea, polyamines, EDTA, hydrazine and other nitrogenous compounds (EP 181 035, EP 335 754, EP 1 043 069, WO 01/76741, U.S. Pat. Nos. 3,954,673 and 4,012, 340). Patent EP-628 347 from Eurecat provides, in order to modify and sulfurize catalysts based on refractory oxides and on metals from Groups VI and VIII, for the presulfurization of these conventional catalysts with a mixture comprising a first sulfur compound with a decomposition point $T_1$ of less than 220° C. and a second sulfur compound with a decomposition point $T_2$ of greater than 220° C. The first sulfur compound includes a C—S or S—S structure and the second sulfur compound includes at least one S=O structure and is chosen from compounds of sulfone or sulfoxide type, for example alkyl, aryl, alkylaryl or arylalkyl sulfones.

All these modifications are targeted at improving the effectiveness of these catalysts in hydrotreating, more particularly in desulfurization, but require the use of chemicals not always under the control of the refining industry. In addition, these modifications do not always make it possible to achieve the sulfur contents required by the specifications expected in Europe by 2005 in middle distillates resulting from direct distillation or refined fractions used as components of diesel fuels.

In some countries, such as Sweden, the United States, in particular in California, and others, the total sulfur content of gas oils is already limited to 0.005% by weight and this limitation may eventually become general in the countries of the OECD. For Europe, this objective of 0.005% by weight of total sulfur should be achieved in 2005 but a content of 0.001% by 2010 is already being raised.

U.S. Pat. No. 3,945,914 A discloses a process for the desulfurization of hydrocarbons by oxidation, in a first stage, of at least a portion of the sulfur-comprising hydrocarbons in the presence of oxidizing compounds (peracids, hydroperoxides and peroxides) and then conversion, in a second stage, of the oxidized sulfur-comprising hydrocarbons to metal sulfides, after bringing these compounds into contact with a metal at a temperature of greater than 260° C.

The essential metal is molybdenum in the dissolved form or the form supported on a refractive oxide of the alumina type, optionally in combination with another metal.

In this two-stage process, the sulfones and sulfoxides of the benzothiophene derivatives, including the sulfones and sulfoxides of the other sulfur-comprising compounds predominant in the hydrocarbons, cannot be absorbed by a solid catalyst as, at these temperatures, they react with the metal to form metal sulfides, this reaction promoting the desulfurization of the hydrocarbons. In addition, according to this patent, the support is not critical as it is not involved in the sulfurization reaction of the metal (column 4, lines 25 to 29) and the catalyst does not have to be sulfurized.

The Applicant Company has designed a novel type of hydrotreating catalyst based on refractive oxides and on metals from Groups VI and VIII which makes it possible to achieve a preset sulfur content with an increase in reaction temperature of at least 5 to 25° C. with respect to an unmodified conventional catalyst, all other operating conditions for the process, pressure, amount of hydrogen and hourly space velocity (HSV), being identical. Such an increase with regard to the reaction temperature makes it possible to envisage the achievement of sulfur contents far below 50 ppm and even below 10 ppm by varying these same operating conditions.

A first subject matter of the present invention is thus a hydrotreating catalyst comprising a support formed of refractory oxides, at least one metal from Group VIII and at least one metal from Group VI, both in the oxidized form, characterized in that it comprises at least one sulfone compound and/or sulfoxide compound derived from at least one benzothiophene compound.

In the continuation of the present description, the term "metal catalyst" will be used to refer to any catalyst comprising a support formed of refractory oxides and at least one metal from each of Groups VI and VIII in the oxidized form.

The term "hydrotreating" is understood to mean any process involving hydrogen for the purpose of reducing the sulfur contents of the hydrocarbons treated, whatever the refined fraction from which they originate; processes comprising a hydrotreating (desulfurization, denitrogenation and dearomatization) or a hydrocracking are to be understood in particular.

The compound characteristic of the catalyst in accordance with the invention is chosen from sulfones and sulfoxides of benzothiophenes, of dibenzothiophenes and more generally of polyarylthiophenes, which may or may not be substituted by alkyl or allyl hydrocarbon chains optionally comprising aliphatic and/or aromatic rings, and it can be used alone or as a mixture. Preferably, this compound is a commercial sulfone and/or sulfoxide compound or a product resulting from the oxidation of the benzothiophene compounds present in the hydrocarbon fractions obtained by refining crude oils.

In a preferred embodiment of the invention, at least one of the sulfone and/or sulfoxide compounds results from the oxidation of a desulfurized or nondesulfurized hydrocarbon fraction by an oxidizing compound chosen from organic and inorganic peroxides and hydroperoxides and organic or inorganic peracids, optionally in the presence of a catalyst. Hydrogen peroxide and tert-butyl hydroperoxide are among the preferred oxidizing agents.

Thus, the hydrotreating catalyst according to the invention, while exhibiting characteristics of activity and of selectivity comparable with, indeed even better than, those of the commercially available catalysts, can advantageously be prepared in a refinery and can then be immediately used in this same refinery. In addition, it exhibits the advantage of being able to be prepared from regenerated catalysts already available on site and which are much cheaper than the most effective hydrotreating catalysts on the market as regards hydrotreating.

In order to be effective in hydrotreating, the catalyst will comprise at least 0.01% by weight of at least one sulfone and/or sulfoxide compound and preferably from 0.01% to 10% by weight.

Another subject matter of the invention is the process for the preparation of the hydrotreating catalyst. It necessarily comprises a stage of formation and/or of deposition of sulfone and/or sulfoxide compounds at the surface of a metal catalyst. The deposition of these compounds can be carried out by impregnation, grafting or formation at the surface of the catalyst.

More particularly, the process consists in introducing, into a reactor comprising the metal catalyst, an organic fluid comprising at least one benzothiophene compound and an oxidizing compound from the group consisting of organic or inorganic peroxides and hydroperoxides and organic or inorganic peracids, starting from ambient temperature and at atmospheric pressure, and in then recovering the catalyst supporting the sulfoxide and/or sulfone compounds which are formed.

The organic fluid used is chosen from paraffin, aromatic and naphthenic hydrocarbons and the solvents for benzothiophene compounds, such as benzene, toluene and/or xylene, and hydrocarbon fractions resulting from the refining of crude oils. In a preferred form, the organic fluid is a hydrocarbon fraction with minimum and maximum boiling points varying from 40 to 560° C.

In its preferred embodiment, the process for the preparation of the hydrotreating catalyst according to the invention consists in carrying out an oxidizing desulfurization, in the presence of the metal catalyst, of a hydrocarbon fraction with minimum and maximum boiling points varying from 40 to 560° C. Preferably, this metal catalyst comprises a support made of silica and/or of alumina and a combination of metals from Groups VI and VIII, in the oxidized form, chosen from the group consisting of nickel/molybdenum, cobalt/molybdenum, nickel/tungsten, nickel/cobalt/-molybdenum and nickel/tungsten/molybdenum combinations.

This metal catalyst can be a freshly prepared or commercial catalyst and it will be used fresh or after regeneration, that is to say essentially after combustion of the coke deposited on this catalyst during a hydrotreating operation, in the context of the present invention.

This preparation process according to the invention can be carried out either ex situ, before charging to the hydrotreating reactor, or in situ, in the reactor which will be used subsequently as hydrotreating reactor.

Of course, it will not be departing from the scope of the invention if this preparation process were applied to any other catalytic support for the purpose of increasing its activity in hydrotreating.

A third subject matter of the invention is the use of this catalyst in a process for the hydrotreating of hydrocarbons, after sulfurization in situ or ex situ of this catalyst using at least one sulfur compound chosen from hydrogen sulfide, mercaptans, sulfides and/or polysulfides and other sulfurizing compounds, this compound being introduced in the gaseous form, in the liquid form, after dilution of the solid or the liquid in a solvent, or directly in the liquid form, optionally even as additive of the feedstock to be hydrotreated. This sulfurization can also be carried out solely by the feedstock to be hydrotreated.

A fourth subject matter of the invention is a process for the purification, down to less than 10 ppm of sulfur, of a sulfur-comprising, nitrogen-comprising and/or aromatic hydrocarbon feedstock, this process comprising a first stage of hydrotreating the distillate in the presence of the modified metal catalyst of the invention, after sulfurization of the latter, and a second stage of oxidizing desulfurization of the hydrotreated feedstock.

In a preferred form of this purification process, the oxidizing desulfurization of the hydrotreated feedstock is carried out in the presence of a metal catalyst and of an oxidizing agent chosen from organic or inorganic peroxides and hydroperoxides and organic or inorganic peracids. Preferably, the oxidizing agent is hydrogen peroxide or tert-butyl hydroperoxide. The metal catalyst will advantageously comprise a support made of silica and/or of alumina and a combination of metals from Groups VI and VIII, in the oxidized form, which combination is chosen from the group consisting of nickel/molybdenum, cobalt/molybdenum, nickel/tungsten, nickel/cobalt/molybdenum and nickel/tungsten/molybdenum combinations.

In a favored embodiment of the invention, in particular when the hydrotreating and oxidizing desulfurization operations are carried out in the same refinery, the spent metal catalyst, but modified according to the invention, obtained at the end of the oxidizing desulfurization cycle is used as hydrotreating catalyst after sulfurization ex situ or in situ in the hydrotreating reactor. The end of the oxidizing desulfurization cycle can advantageously correspond to the moment when the total sulfur content of the effluent again rises above 10 ppm.

Taking the above into consideration, the process according to the invention can be carried out in the same reactor or in at least two separate reactors, for example arranged in series.

In the configuration using two separate reactors, the latter can operate alternately in hydrotreating and in oxidizing desulfurization, each reactor carrying out a different treatment during the same purification cycle. The advantage of this embodiment is that only the catalyst used in hydrotreating has to be discharged and regenerated before being reused in oxidizing desulfurization. Furthermore, the catalyst resulting from the oxidizing desulfurization exhibits a much higher activity than if it had been used directly in hydrotreating.

Another configuration provides for one of the two reactors to always operate in hydrotreating and for the other reactor to always operate in oxidizing desulfurization; the catalyst at the end of the oxidizing desulfurization cycle is then discharged, then recharged to the hydrotreating reactor and, finally, sulfurized according to conventional methods. Furthermore, a conventional unmodified hydrotreating metal catalyst is charged to the oxidizing desulfurization reactor. As in the preceding configuration, the hydrotreating catalyst still has to be regenerated.

The purification process is particularly suitable for a hydrocarbon feedstock with minimum and maximum boiling points ranging from 40 to 560° C., it being possible for this feedstock to originate in particular from an atmospheric distillation, a vacuum distillation, an FCC catalytic cracking, a hydrocracking, a coking or a visbreaking.

The examples which follow are targeted at illustrating the invention but have no limiting nature.

EXAMPLE I

In the present example, a description is given of the preparation of five sulfurized catalysts which will be used subsequently in desulfurization, denitrogenation and dearomatization. All these catalysts are prepared from a commercial catalyst A, composed of a combination comprising 3% of cobalt and comprising 10% of molybdenum on an alumina support, available commercially and commonly used by refiners in their hydrodesulfurization units.

The modification and/or sulfurization treatments applied to this catalyst are summarized in table I below.

TABLE I

| Catalyst | Treatment | Modification | Sulfurization |
|---|---|---|---|
| A | None | None | $GO_1$ + 2% by weight of DMDS |
| B | Ex situ | $GO_1$ alone | $GO_1$ + 2% by weight of DMDS |
| C | In situ | $GO_1$ alone | $GO_1$ + 2% by weight of DMDS |
| D | Ex situ | $GO_1$ + 6.3% by weight of TBHP | $GO_1$ + 2% by weight of DMDS |
| E | In situ | $GO_1$ + 6.3% by weight of TBHP | $GO_1$ + 2% by weight of DMDS |
| F | Ex situ | dBTS | $GO_1$ + 2% by weight of DMDS |
| G | In situ | $GO_2$ + 6.3% by weight of TBHP | $GO_1$ + 2% by weight of DMDS |

*TBHP = 5M solution of tert-butyl hydroperoxide in decane.
*dBTS = 5% dibenzothiophene sulfone in ethanol.
*DMDS = dimethyl disulfide.
*$GO_1$: gas oil comprising 1% of sulfur.
*$GO_2$: gas oil comprising 50 ppm of sulfur.

The ex situ modification using gas oil comprising TBHP is carried out as follows.

38 g of the TBHP solution are added to 600 g of direct distillation gas oil ($GO_1$) comprising 1% by weight of sulfur (approximately 700 ml) placed in a round-bottomed flask. 100 g of catalyst A are then added to this mixture. The combined mixture is stirred at a moderate rate at 70° C. for 3 hours. The modified catalyst is subsequently recovered by filtration, then washed three times with 200 ml of toluene at ambient temperature and, finally, washed with 3 times 200 ml of pentane at ambient temperature. The catalyst thus recovered is dried under air at 80° C. for 3 hours in a ventilated oven.

The in situ modification consists in introducing 100 ml of catalyst A into the reactor of a pilot unit of Catatest type. A gas oil ($GO_1$ or $GO_2$), to which the TBHP solution has been added, is passed over this catalyst at an hourly space velocity (HSV) of 1 $h^{-1}$ at atmospheric pressure at a temperature of 70° C. After 7 hours ($GO_1$) or 70 hours ($GO_2$), the injection of additivated gas oil is halted. A slight nitrogen stream is passed in the downward flow mode for the purpose of removing the excess gas oil present in the reactor.

The ex situ modification using dibenzothiophene sulfone (dBTS) is identical to the modification using gas oil and TBHP, apart from the fact that the gas oil/TBHP mixture is replaced by the commercial sulfone in solution in ethanol.

Catalysts B and C were obtained by wetting catalyst A with direct distillation gas oil alone comprising 1% by weight of sulfur, the operation being carried out as described above for the ex situ and in situ modifications. They constitute catalysts for comparisons with the other four catalysts, D, E, F and G, in accordance with the invention.

The catalysts were all sulfurized with a gas oil to which 2% by weight of DMDS had been added, according to the procedure recommended by the manufacturer of catalyst A.

EXAMPLE II

The present example is intended to show that the catalysts of the invention have a much higher activity in hydrodesulfurization and denitrogenation than that obtained with the unmodified commercial catalyst A.

Catalysts A, B, C, D, E, F and G of example 1 are subjected, in a tubular reactor of a pilot hydrotreating unit operating in downward flow, to a first stage of stabilization by hydrotreating a direct distillation gas oil. Subsequently, a hydrocarbon feedstock comprising 75% by volume of direct distillation gas oil and 25% by volume of a 220-350° C. hydrocarbon fraction resulting from catalytic cracking, usually referred to as LCO (Light Cycle Oil), is hydrotreated. The characteristics of the mixture are given in table II below.

TABLE II

| Type of feedstock | 25% LCO-75% GO mixture | $GO_1$ | $GO_2$ |
|---|---|---|---|
| Sulfur (ppm) | 14 447 | 10 117 | 49 |
| Density at 15° C. (g/ml) | 0.8684 | 0.8579 | 0.8501 |
| Monoaromatics (% by weight) | 18.7 | 14.8 | 28 |
| Diaromatics (% by weight) | 14.8 | 13 | 5 |
| Triaromatics (% by weight) | 2.8 | 1.6 | 1 |
| Total aromatics (% by weight) | 36.3 | 29.4 | 34 |
| Nitrogen (ppm) | 228 | 158 | 29.7 |
| ASTM D86 (° C.) | | | |
| Initial boiling point | 203 | 244 | 201 |
| 5 vol % | 230 | 264 | 229 |
| 10 vol % | 244 | 273 | 241 |
| 20 vol % | 257 | 280 | 255 |
| 30 vol % | 268 | 286 | 266 |
| 40 vol % | 278 | 293 | 276 |
| 50 vol % | 289 | 299 | 287 |
| 60 vol % | 301 | 306 | 298 |
| 70 vol % | 314 | 314 | 311 |
| 80 vol % | 329 | 324 | 326 |
| 90 vol % | 347 | 339 | 347 |
| 95 vol % | 359 | 350 | 363 |
| Final boiling point | 363 | 352 | 365 |

The operating conditions are given in table III below.

TABLE III

| Pressure | $27 \times 10^5$ Pa |
|---|---|
| HSV | $1\ h^{-1}$ |
| H$_2$/oil mixture ratio | 130 Sl/l |

In order to compare the activities in desulfurization and in denitrogenation, the reaction temperature is adjusted so as to achieve either 98% desulfurization or 50% denitrogenation of the hydrotreated feedstock. The lower this temperature for a given catalyst with respect to the corresponding temperature for the reference catalyst A, the more active this catalyst is in desulfurization or in denitrogenation.

For the reference catalyst A, the temperatures referenced $T_{HDS}$ and $T_{HDN}$ respectively for the hydro-desulfurization and the denitrogenation correspond to the temperatures required to achieve 98% desulfurization and 50% denitrogenation.

The results of the tests are given in table IV below.

TABLE IV

| | A | B | C | D | E | F | G |
|---|---|---|---|---|---|---|---|
| $T_{HDS}$ | | $T_{HDS}$-1° C. | $T_{HDS}$-2° C. | $T_{HDS}$-19° C. | $T_{HDS}$-18° C. | $T_{HDS}$-15° C. | $T_{HDS}$-19° C. |
| $T_{HDN}$ | | $T_{HDN}$-2° C. | $T_{HDN}$-3° C. | $T_{HDN}$-28° C. | $T_{HDN}$-26° C. | $T_{HDN}$-20° C. | $T_{HDN}$-27° C. |

Catalysts D, E, F and G (in accordance with the invention) exhibit an activity in HDS and HDN which is much higher than that of the reference catalyst A, whereas catalysts B and C exhibit an activity equivalent to that of catalyst A.

EXAMPLE III

The activities of a fresh modified hydrotreating catalyst according to the invention and of this same catalyst, regenerated after a hydrotreating cycle and then modified according to the invention, are compared in the present example.

After a first hydrotreating cycle, the catalyst G of example II is regenerated by combustion of the coke under an oxidizing atmosphere at 450° C. for at least 5 hours. The regenerated catalyst is modified as described in example II for catalyst G, and a catalyst G' is obtained and is subsequently sulfurized as described in example II. A new hydrotreating cycle identical to the cycle applied to catalyst G is then carried out.

The hydrotreating temperatures required for G and G' are compared with respect to the reference catalyst A in table V.

TABLE V

| | A | G | G' |
|---|---|---|---|
| $T_{HDS}$ | | $T_{HDS}$ -19° C. | $T_{HDS}$ -18° C. |
| $T_{HDN}$ | | $T_{HDN}$ -27° C. | $T_{HDN}$ -25° C. |

It is found, from this table, that, after regeneration and modification again according to the invention, the regenerated commercial catalyst regains virtually the same performance as that of the fresh modified catalyst.

What is claimed is:

1. A process for hydrotreatment of a hydrocarbon feedstock, comprising:

carrying out in situ or ex situ sulfurization of a catalyst by contacting the catalyst with at least one sulfur compound selected from hydrogen sulfide, mercaptans, sulfides, polysulfides or other sulfurizing compounds, the catalyst comprising a support formed of refractory oxides, at least one metal from Group VIII and at least one metal from Group VI, both in the oxidized form, and comprising at least one sulfone compound and/or sulfoxide compound derived from at least one benzothiophene compound; and hydrotreating the hydrocarbon feedstock in the presence of the catalyst, wherein said at least one sulfur compound may be present in the feedstock.

2. A process for the purification, down to less than 10 ppm of sulfur, of a sulfur-comprising, a nitrogen-comprising and/or an aromatic hydrocarbon feedstock, comprising a first stage of hydrotreating the hydrocarbon feedstock in the presence of a catalyst, after sulfurization of the catalyst, and a second stage of oxidizing desulfurization of the hydrotreated feedstock, wherein the catalyst comprises a support formed of refractory oxides, at least one metal from Group VIII and at least one metal from Group VI, both in the oxidized form, and comprising at least one sulfone compound and/or sulfoxide compound derived from at least one benzothiophene compound.

3. The process as claimed in claim 2, characterized in that the oxidizing desulfurization is carried out in the presence of a metal catalyst based on refractory oxides supporting at least one metal from each of Groups VI and VIII and of an oxidizing agent chosen from organic or inorganic peroxides and hydroperoxides and organic or inorganic peracids.

4. The process as claimed in claim 3, characterized in that the modified metal catalyst obtained at the end of the oxidizing desulfurization cycle is used as hydrotreating catalyst, after ex situ sulfurization or in situ sulfurization in a hydrotreating reactor.

5. The process as claimed in one of claims 2 to 4, characterized in that the process is carried out in the same reactor or in at least two separate reactors.

6. The process as claimed in claim 5, characterized in that the two separate reactors operate alternately in hydrotreating and in oxidizing desulfurization, each carrying out a different treatment.

7. The process as claimed in claim 5, characterized in that one of the reactors always operates in hydrotreating and the other reactor always operates in oxidizing desulfurization.

8. The process as claimed in claims 2, 3, 4, 6, or 7, characterized in that the hydrocarbon feedstock is a hydrocarbon feedstock with minimum and maximum boiling points of between 40 and 560° C.

9. The process as claimed in claim 3, wherein the oxidizing agent is hydrogen peroxide or tert-butyl hydroperoxide.

10. The process as claimed in claim 1 or 2, wherein said compound is chosen from sulfones and sulfoxides of benzothiophenes, sulfones and sulfoxides of dibenzothiophenes, and sulfones and sulfoxides of other polyarylthiophenes, which may or may not be substituted by alkyl or allyl hydrocarbon chains optionally comprising aliphatic and/or aromatic rings, said compound being used alone or in admixture with one or more other said compounds.

11. The process as claimed in claim 1 or 2, wherein said compound is a commercially available sulfone and/or sulfoxide compound, or a sulfone and/or sulfoxide compound originating from oxidation of benzothiophene compounds present in hydrocarbon fractions obtained by refining crude oils.

12. The process as claimed in claim 1 or 2, wherein at least one of the sulfone and/or sulfoxide compounds results from oxidation of a desulfurized or non-desulfurized hydrocarbon fraction by an oxidizing compound chosen from organic and inorganic peroxides and hydroperoxides and organic or inorganic peracids, optionally in the presence of a metal catalyst.

13. The process as claimed in claim 1 or 2, wherein the catalyst comprises at least 0.01% by weight of said at least one sulfone and/or sulfoxide compound.

* * * * *